United States Patent [19]

Brannan

[11] Patent Number: 4,572,087
[45] Date of Patent: Feb. 25, 1986

[54] FERTILIZER INJECTION APPARATUS

[76] Inventor: J. Phillip Brannan, 11834 Chicago Pl., Omaha, Nebr. 68154

[21] Appl. No.: 687,994

[22] Filed: Dec. 31, 1984

[51] Int. Cl.⁴ ............................................... A01C 5/00
[52] U.S. Cl. ...................................... 111/56; 172/325; 280/446 R
[58] Field of Search ............... 111/6, 7, 34, 52, 56, 111/73, 80; 172/324–328, 397, 398; 280/6 R, 6.1, 6.11, 7, 446 R

[56] References Cited

U.S. PATENT DOCUMENTS

| | | | |
|---|---|---|---|
| 2,170,490 | 8/1939 | Stevens | 111/56 |
| 2,248,505 | 7/1941 | McKahin | 172/328 |
| 3,212,588 | 10/1965 | Schmidt | 280/446 R |
| 3,605,657 | 9/1971 | Brannan | 111/7 |
| 3,891,109 | 6/1975 | Olson | 111/7 |
| 4,428,435 | 1/1984 | Hubbard et al. | 172/328 |
| 4,450,917 | 5/1983 | Hake | 172/328 |

FOREIGN PATENT DOCUMENTS

| | | | |
|---|---|---|---|
| 2018710 | 11/1971 | Fed. Rep. of Germany | 111/7 |
| 1270715 | 7/1961 | France | 111/7 |
| 1386236 | 12/1965 | France | 111/6 |
| 1498080 | 10/1967 | France | 111/7 |
| 2359452 | 2/1978 | France | 111/34 |
| 839827 | 6/1981 | U.S.S.R. | 280/446 R |

Primary Examiner—James R. Feyrer
Attorney, Agent, or Firm—E. Robert Newman

[57] ABSTRACT

A fertilizer injection apparatus having hollow, ground-piercing knives connected by tubes to a hopper with a fertilizer delivery system. A tool bar is connected to the hopper by rigid links pivoted to the tool bar at one end about the single axle of the hopper at the other end. A bell crank lever mechanism interconnected between the tool bar, each link and the hopper, maintains the hopper level with the ground regardless of whether the knives are above ground or how far they are inserted. The tool bar and hopper combination are pivotally towed by a tractor and a liquid fertilizer tank system which delivers its contents through hoses to an anterior point on each knife is towed behind the hopper.

20 Claims, 3 Drawing Figures

FERTILIZER INJECTION APPARATUS

TECHNICAL FIELD

The present invention relates generally to apparatus employed to inject both dry, granular fertilizer and liquid fertilizers into the soil and more particularly to apparatus which injects both the dry fertilizer and liquid fertilizer into the soil in bands at depths somewhat below ground level.

BACKGROUND ART

Until recently, the most advantageous method of fertilizing a tract of ground has been to broadcast fertilizers, both dry and liquid, over the ground and then disc or chisel them under the surface. Injecting fertilizers into the ground along desired bands, also known as "deep placement," has been gaining in popularity. As compared with broadcasting fertilizers, some advantages of injecting them are as follows:

(1) Phosphate which is applied to the soil becomes tied up by the presence of iron, aluminum, and calcium. By deep-placing fertilizer in a narrow band, the amount of phosphate so tied up is reduced.

(2) Since deep-placement requires substantially less tillage, exposure of topsoil to wind and erosion is reduced.

(3) The effect of knifing-in dry and liquid fertilizer to a depth (8 to 10 inches) below that of disc level (5 to 8 inches) is that soil below the normal fertilizer level is loosened, thereby further reducing the need for tillage.

(4) More water is available for a longer period of time in dry seasons, since it may reside at the lower levels created by deep-placement.

(5) Depleted nutrients, once abundant in the lower soil levels, are replenished.

(6) Soil compaction and operating costs are reduced, since large, dry fertilizer spreader trucks are eliminated.

A typical arrangement for deep-placing fertilizer is a series of hollow injector knives attached to a tool bar which is mounted to a three point hitch at the rear of a tractor, whereby the knives can be lowered into the ground. Towed behind the tool bar is a four-wheeled hopper containing some means for blowing dry fertilizer through tubing connected to the knives. Towed behind the hopper is a liquid fertilizer tank which includes pump and hose connections for delivering fertilizer through hoses connected anterially to each knife.

Although, in general, this arrangement has performed satisfactorily, there are problems related to its having two articulated elements spaced away from the tractor by the tool bar. Maneuverability is limited, and reversing directions at the end of each swath is difficult and requires a great deal of unused margin land. It is also time-consuming and difficult to align and connect the second of the two articulated elements.

DISCLOSURE OF INVENTION

An object of the present invention is the provision of an improved apparatus for deep-placement of dry and liquid fertilizer into the soil.

Another object is to provide an apparatus for injecting fertilizer into the soil in which the tool bar is integrated with the hopper in order to have one articulated element connected directly to the tractor.

A further object of the invention is the provision of an apparatus for injecting fertilizer into the soil which is easier, more efficient, and more effective to handle than the prior art.

To accomplish the aforesaid, an apparatus for injecting fertilizer into the soil is provided which includes a tool bar which supports vertically oriented, hollow, ground-piercing knives, said tool bar being connected to a dry fertilizer hopper by a left elongated rigid link and a right elongated rigid link which are vertically pivoted to the tool bar and which are rotatably supported at their other ends to the single axle of the hopper. The single axle of the hopper is centrally located thereunder and is supported by two trusses, each having two wheels journaled fore and aft. A left and right system of bell crank levers with two pivoting links interconnect each elongated rigid link, the hopper, and the tool bar in such manner that the hopper is maintained at a given angular orientation with respect to the ground under it as the angle between the tool bar and the rigid links is changed. Thus, the hopper is maintained substantially level with respect to the terrain over which the apparatus is pulled by the tractor, regardless of what depth the knives are inserted or whether they are raised for transport.

By virtue of this arrangement the tool bar and hopper are integrated, that is they are close together and do not articulate with respect to each other. By maintaining the level of the hopper constant with respect to the terrain over which it moves, it is possible to deliver a consistent quantity of dry fertilizer to the knives. Such delivery is accomplished by a conveyor installed near the bottom of the hopper which moves the granular material forward into a chamber from which it is blown through individual flexible tubes connected with each knife. The liquid fertilizer tank is connected through a hitch at the rear of the hopper and delivery of its contents is through a main hose to the tool bar and then through individual hoses running along the anterior of each knife. The first articulation between tractor and a functional part of the apparatus is at the tractor hitch, greatly enhancing ease of operation.

These and other objects, advantages, and novel features of the present invention will become apparent from the following detailed description of the invention when considered in conjunction with the accompanying drawings.

BEST MODE FOR CARRYING OUT THE INVENTION

Figure 1:
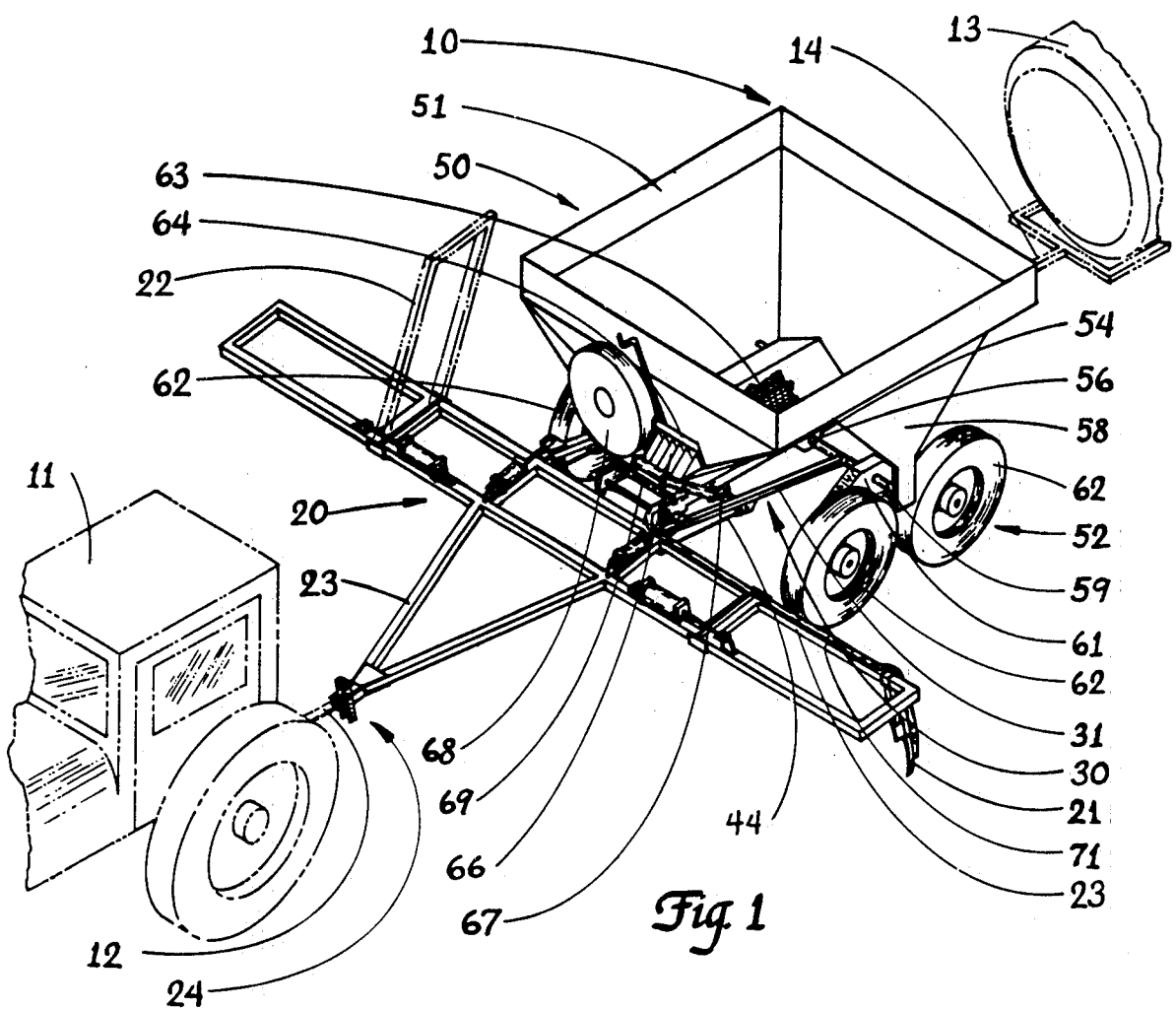
FIG. 1 is an isometric view of the invention shown in the context of its anticipated environment; that is, towing a liquid fertilizer tank (shown partially in phantom lines) and being towed by a tractor (shown partially in phantom lines)

Referring now to the drawings wherein like reference numerals designate identical corresponding parts throughout the several views, and more particularly to FIG. 1, the fertilizer injection apparatus, designated generally at 10, is comprised of a tool bar assembly, designated generally at 20, which supports ground piercing knife 21 and is connected by a hinged linking mechanism, designated generally at 30, to a dry fertilizer delivery system, designated generally at 50. The tool bar contemplated by the inventor would handle from nine to seventeen knives 21, depending on the type of crop and the row spacing. FIG. 1 however shows the device with only one knife.

A tractor 11 pulls fertilizer injection apparatus 10 through the connection of tool bar assembly 20 to tow bar 12, and fertilizer injection apparatus in turn tows liquid fertilizer tank 13 through tow bar 14. Tool bar assembly 20 may be outfitted with conventional hinged wing assemblies 22 for ground transport mode. Ground piercing knife 21 is attached to the rear element 23 of tool bar assembly 20 in a conventional manner.

Figure 3:
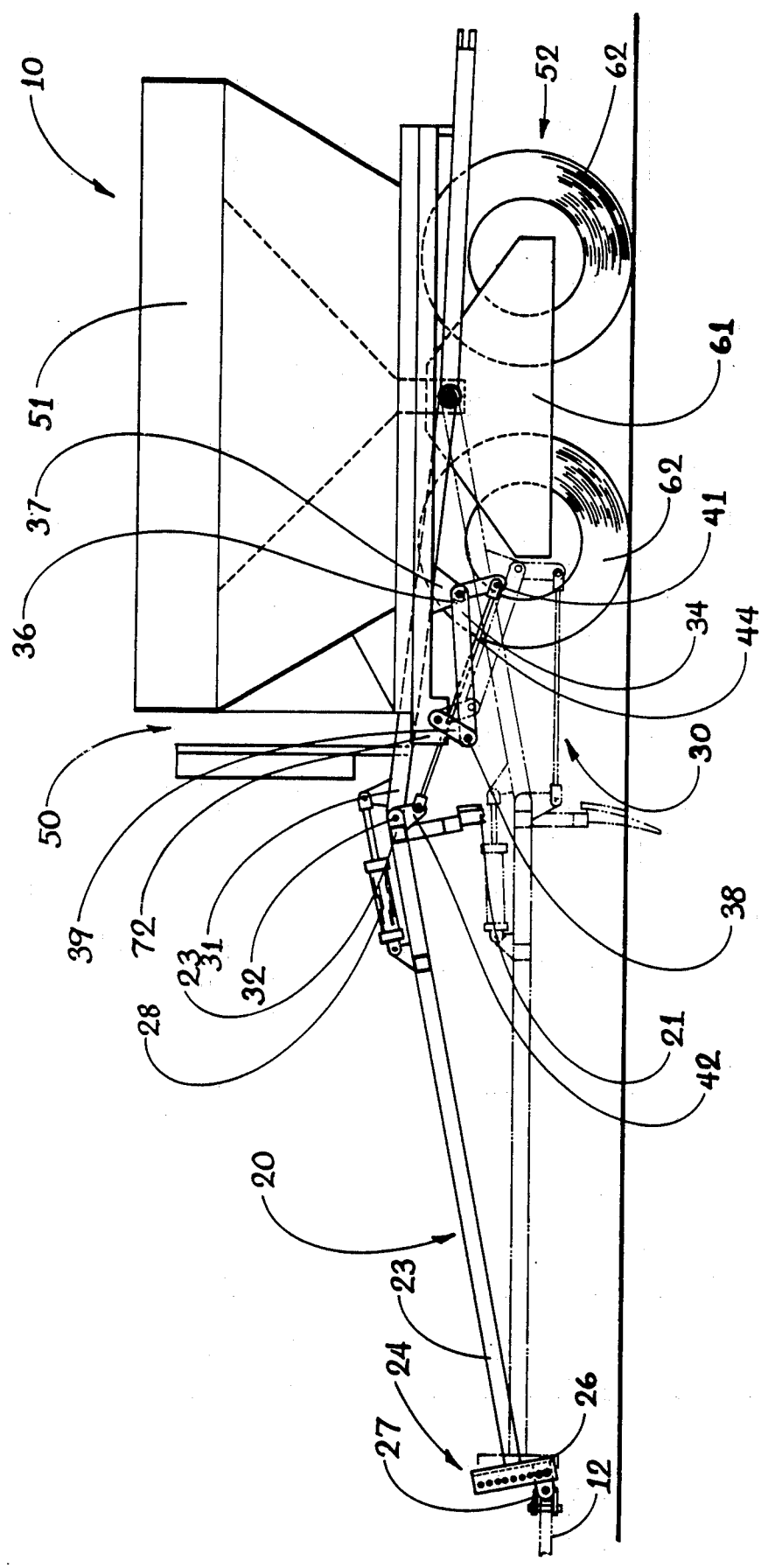
FIG. 3 is an enlarged elevational center sectional view of the invention with certain elements shown in solid lines in position for transport from one field to another or over the road and the same elements shown in phantom lines in position for injecting fertilizer into the soil.

A hitch assembly, designated generally at 24, is of a type which will provide both vertical elevation and vertical hinging movement of tool bar assembly 20. Tool bar assembly 20 must be somewhat level with the ground, or perhaps sloping slightly upwards towards the hopper 51, when knife 21 is about to pierce the ground. As best seen in FIG. 3, vertical elevation assembly 26, comprising a channel having a plurality of perforations and a removable pin, provides for height variations among tow bars 12 of different tractors 11. Vertically hinged clevis 27 provides for the smooth, arcuate entry of knife 21 into the ground and its eventual proper vertical orientation therein, as well as its elevated position in transport mode, as seen in solid lines in FIG. 3.

Figure 2:
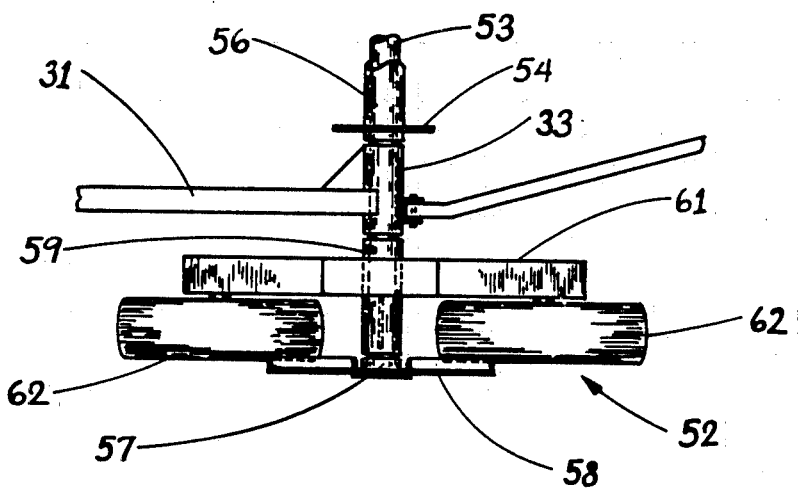
FIG. 2 ia an enlarged plan view of the wheel and truss assembly. including a portion of the supporting pipe axle and portions of other connecting elements, some of which are shown in section.

Referring again to FIG. 1, the primary element of fertilizer delivery system 50 is hopper 51 which is supported by two wheel assemblies, designated generally at 52, through a single axle 53 (See FIG. 2). This arrangement is accomplished through a vertical support 54 which is rigidly affixed to a bearing (pipe) sleeve 56 in which axle 53 revolves. Axle 53 also revolves within an end bearing 57 to which is affixed a second vertical support 58. Another vertical support 54 is affixed to pipe sleeve 56 on the other side of the center of hopper 51 as is another second vertical support 58 affixed to another end bearing 57 on the other end of axle 53. On either side of hopper 51 and adjacent to end bearing 57 is a sleeve (pipe) bearing 59 on which is affixed a truss 61. Four wheels 62 each are journaled in a conventional manner on fore and aft positions of each truss 61.

It should be apparent that without some compensating connection between hopper 51 and tool bar assembly 20, hopper 51 would tester on axle 53 to a steep angle, either forwards or backwards. Hinged linking mechanism 30 performs this function, as well as causing hopper 51 to remain relatively level with the ground, in a manner described below.

On the floor of hopper 51 is continuous conveyor 63 of the well-known steel apron type. Conveyor 63 moves the fertilizer forward by a series of gears (not shown) attached to a small drive wheel (also not shown) which runs on one of the four wheels 62 supporting hopper 51. As the dry granular fertilizer proceeds to the forward end of hopper 51 it will pass beneath guillotine gate 64 to permit chamber 66 to be filled with an adequate supply of fertilizer. Air delivery tube 67 of centrifugal fan assembly 68 is connected to one lateral end of air chamber 66. Chamber 66 has an opening at 69 along its forward end for each hollow ground piercing knife 21.

Each opening 69 is connected to each hollow ground piercing knife 21 by tubing 71 which is fastened in a conventional manner to tool bar assembly 20. FIG. 1 however shows the device with only one section of tubing 71.

Referring now to FIG. 3, substantially all elements of hinged linking assembly 30 are duplicated on either side of hopper 51. Connecting hopper 51 to tool bar assembly 20 is elongated rigid link 31. At its forward end link 31 is hinged about horizontal axle 32 which is supported by the rearward side of rear element 25 of tool bar assembly 20. At its rearward end rigid link 31 is rigidly connected to bearing (pipe) sleeve 33 which is mounted over axle 53. This arrangement is best seen in FIG. 2 where it may also be observed that pipe sleeve 56, end bearing 57, pipe sleeve 59, and pipe sleeve 33, are each of such a length that, by substantially enclosing all of axle 53, the various rigid elements attached to each pipe sleeve are maintained in their desired position along axle 53.

Referring again to FIG. 3, bell crank lever 34 is hingedly attached near the apex of its angle 36 to support element 37 which in turn is rigidly attached to link 31 intermediate its ends. Hingedly attached to the forward end 38 of bell crank lever 34 and to a projecting structural member 72 of hopper 51, is short hinged link 39. Hingedly attached to the rearward end 41 of bell crank lever 34 and to a support element 42 which is rigidly attached to and depending from the underside of rear element 23 of tool bar 20, is long rigid rod 44. In a well known manner cylinder 28 of tool bar assembly 20 is employed to move ground piercing knife 21 between a transport mode (seen in solid lines in FIG. 3) to the desired depth beneath the ground (seen in phantom lines in FIG. 3).

As stated above, hinged linking mechanism 30, besides connecting hopper 51 to tool bar assembly 20, serves to maintain the angular orientation of hopper 51 with respect to the ground. By controlling cylinder assembly 28, the vertical position of knife 21 is controlled, and elongated rigid link 31 is moved from a position such as is shown in FIG. 3 in solid lines to the position in phantom lines. In such case the apex of angle 36 of bell crank lever 34, being hinged to support member 37 of rigid link 31, will be lowered along with link 31. The distance which it will be lowered is necessarily lesser than that of knife 21 and is proportionate to the position of support 37 along link 31 and the overall length of link 31. Because the forward end 38 of bell crank lever 34 is connected through link 39 to member 72 of hopper 51 and the rearward end 41 is connected through rod 44 to support 42 on tool bar assembly 20, the angular orientation of hopper 51 is controlled by the relative length of the several members of hinged linking mechanism 30, the size of angle 36, and the locations of the points at which they are hingedly connected to tool bar assembly 20, hopper 51, and each other (primarily link 31). It would be possible to dimension and shape the members of hinged linking mechanism 30, as well as to locate their connecting points, such that the angular orientation of hopper 51 would vary as cylinder 28 is extended and retracted. Thus, once all of the elements of hinged linking mechanism 30 are in place, hopper 51 is no longer free to teeter independently about axle 53. As it is desirable to provide an even distribution of dry, granular fertilizer carried by hopper 51 across conveyor 63 in order that the supply of fertilizer to chamber 66 will be constant, the invention entails the selection of dimensions for the members of hinged linking mechanism 30, the locations of their pivotal connections, and the size of angle 36, such that hopper 51 will teeter neither forwards nor backwards. It should be obvious that a mathematical formula could be derived which would allow a determination of each dimension, etc, as any of the others were varied. Also, the same can be determined by trial and error, as were those shown in the drawings.

Still referring to FIG. 3, it can be seen that as the angle between tool bar assembly 20 and elongated rigid link 31 is increased, the distance between hitch assembly 24 and hopper 51 must also increase. As drawn in FIG. 3, the angle between tool bar assembly 20 and elongated rigid link 31 is slightly smaller in solid lines than it is in phantom lines. Consequently, hopper 51 will be slightly closer to hitch assembly 24 in the solid line orientation depicted. Accordingly, the point at which link 39 pivots on hopper 51, and axle 53, (about which elongated rigid link 31 is pivoted to hopper 51) will also be closer to hitch assembly 24 by the same distance. However, for purposes of clarity these two nearly identical, but slightly different, positions of hopper 51 are not individually drawn. As a consequence the dimensions of some of the elements of hinged linking mechanism 30 in solid lines and phantom lines, which should be equal, are not shown as such.

It will be readily understood that the particular dispostion or arrangement or nature of the elements of the invention are not of the essence of the invention, and that many variations, substitutions, and modifications may be made, in departure from the particular construction and characterization in the drawing and foregoing description, without departing from the true spirit of the invention. It is therefore to be understood that the invention should be limited only by the breadth and scope of the appended claims.

I claim:

1. An apparatus for injecting fertilizer into the ground, comprising:
   a hollow, ground-piercing knife mounted on a tool bar, said tool bar having a hitch-bearing tongue for pivotal connection to a tractor means;
   a dry fertilizer hopper means pivotally supported on a single axle, said axle being supported above the ground by wheel means rotatably connected thereto;
   means for injecting dry fertilizer from said hopper, to the hollow portion of said ground piercing knife and out of a port in said hollow portion into the ground;
   a first rigid link means rotatably connected at one end about said single axle and pivotally connected at its other end to said tool bar about an axis parallel to said axle;
   means for controlling the angle between said tool bar and said first rigid link;
   a bell crank lever means pivotally connected to said first rigid link means and having means for pivotally connecting one leg to a second rigid link means which is pivotally connected at its other end to said hopper and means for pivotally connecting its other leg to a third rigid link means which is pivotally connected at its other end to said tool bar; and
   wherein the fore and aft length of said tool bar, the length of said first rigid link means, the length of the legs of said bell crank lever means, the angle between the legs of said bell crank lever means, the location of where said bell crank lever means is pivotally connected to said first rigid link means, the length of said second rigid link means, the location of where said second rigid link means is pivotally connected to said hopper means, the length of said third rigid link means, and the location of where said third rigid link means is pivotally connected to said tool bar, are all such that the angular relationship of said hopper with respect to the ground under it remains substantially constant as the angle between said tool bar and said first rigid link means is changed.

2. The apparatus for injecting fertilizer into the ground as set forth in claim 1, further comprising:
   means for towing a tank for containing a supply of liquid fertilizer behind said dry fertilizer hopper means;
   hose means for distributing liquid fertilizer from said tank to a point on said ground-piercing knife adjacent to the port thereof.

3. The apparatus for injecting fertilizer into the ground as set forth in claim 2, wherein said towing means is detachable and said hose means further includes means for uncoupling said hose means.

4. The apparatus for injecting fertilizer into the ground as set forth in claim 3, wherein said dry fertilizer injecting means further includes:
   means for conveying fertilizer forward along the bottom of said hopper means;
   chamber means mounted to the front of said hopper means and having means for receiving fertilizer from said conveying means and tube means connecting said chamber means to the hollow portion of said knife; and
   fan means mounted on said hopper means for blowing fertilizer from said chamber into said hose means.

5. The apparatus for injecting fertilizer into the ground as set forth in claim 4 wherein said tool bar supports more than one hollow, ground-piercing knife, said chamber means has separate tube means for connecting it to each knife, whereby the fertilizer in said chamber will be substantially evenly distributed to each knife.

6. The apparatus for injecting fertilizer into the ground as set forth in claim 5 wherein said wheel means includes:
   a truss means rotatably connected to said axle near one end thereof and another near the other end thereof; and
   a single wheel journaled fore and a single wheel journaled aft to each of said truss means.

7. The apparatus for injecting fertilizer into the ground as set forth in claim 2, wherein said dry fertilizer injecting means further includes:
   means for conveying fertilizer forward along the bottom of said hopper means;
   chamber means mounted to the front of said hopper means and having means for receiving fertilizer from said conveying means and tube means connecting said chamber means to the hollow portion of said knife; and
   fan means mounted on said hopper means for blowing fertilizer from said chamber into said hose means.

8. The apparatus for injecting fertilizer into the ground as set forth in claim 7 wherein said tool bar supports more than one hollow, ground-piercing knife, said chamber means has separate tube means for connecting it to each knife, whereby the fertilizer in said chamber will be substantially evenly distributed to each knife.

9. The apparatus for injecting fertilizer into the ground as set forth in claim 8, wherein said wheel means includes:
   a truss means rotatably connected to said axle near one end thereof and another near the other end thereof; and
   a single wheel journaled fore and a single wheel journaled aft to each of said truss means.

10. The apparatus for injecting fertilizer into the ground as set forth in claim 9 wherein said first rigid link means, said angle controlling means, said bell crank lever means, said second rigid link means, and said third rigid link means each include a left-handed element located to the left of center of said hopper means and a right-handed element located on the right of center of said hopper means.

11. The apparatus for injecting fertilizer into the ground as set forth in claim 2 wherein said wheel means includes:
   a truss means rotatably connected to said axle near one end thereof and another near the other end thereof; and
   a single wheel journaled fore and a single wheel journaled aft to each of said truss means.

12. The apparatus for injecting fertilizer into the ground as set forth in claim 11 wherein said first rigid link means, said angle controlling means, said bell crank lever means, said second rigid link means, and said third rigid link means each include a left-handed element located to the left of center of said hopper means and a right-handed element located to the right of center of said hopper means.

13. The apparatus for injecting fertilizer into the ground as set forth in claim 2 wherein said first rigid link means, said angle controlling means, said bell crank lever means, said second rigid link means, and said third rigid link means each include a left-handed element located to the left of center of said hopper means and a right-handed element located to the right of center of said hopper means.

14. The apparatus for injecting fertilizer into the ground in claim 1, wherein said dry fertilizer injecting means further includes:
   means for conveying fertilizer forward along the bottom of said hopper means;
   chamber means mounted to the front of said hopper means and having means for receiving fertilizer from said conveyor means and tube means connecting said chamber means to the hollow portion of said knife; and
   fan means mounted on said hopper means for blowing fertilizer from said chamber into said hose means.

15. The apparatus for injecting fertilizer into the ground as set forth in claim 14 wherein said tool bar supports more than one hollow, ground-piercing knife, said chamber means has separate tube means for connecting it to each knife, whereby the fertilizer in said chamber will be substantially evenly distributed to each knife.

16. The apparatus for injecting fertilizer into the ground as set forth in claim 15 wherein said wheel means includes:
   a truss means rotatably connected to said axle near one end thereof and another near the other end thereof; and
   a single wheel journaled fore and a single wheel journaled after to each of said truss means.

17. The apparatus for injecting fertilizer into the ground as set forth in claim 16 wherein said first rigid link means, said angle controlling means, said bell crank lever means, said second rigid link means, and said third rigid link means each include a left-handed element located to the left of center of said hopper means and a right-handed element located to the right of center of said hopper means.

18. The apparatus for injecting fertilizer into the ground as set forth in claim 1 wherein said wheel means includes:
   a truss means rotatably connected to said axle near one end thereof and another near the other end thereof; and
   a single wheel journaled fore and a single wheel journaled aft to each of said truss means.

19. The apparatus for injecting fertilizer into the ground as set forth in claim 18 wherein said first rigid link means, said angle controlling means, said bell crank lever means, said second rigid link means, and said third rigid lock means each include a left-handed element located to the left of center of said hopper means and a right-handed element located to the right of center of said hopper means.

20. The apparatus for injecting fertilizer into the ground as set forth in claim 1 wherein said first rigid link means, said angle controlling means, said bell crank lever means, said second rigid link means, and said third rigid link means each include a left-handed element located to the left of center of said hopper means and a right-handed element located to the right of center of said hopper means.

* * * * *